(12) United States Patent
Li et al.

(10) Patent No.: US 12,510,940 B2
(45) Date of Patent: Dec. 30, 2025

(54) HEAT DISSIPATION APPARATUS AND COMMUNICATION DEVICE

(71) Applicant: Huawei Technologies Co., Ltd., Shenzhen (CN)

(72) Inventors: Xiaodong Li, Dongguan (CN); Jing Wang, Wuhan (CN); Yukuo Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 18/469,793

(22) Filed: Sep. 19, 2023

(65) Prior Publication Data

US 2024/0012456 A1 Jan. 11, 2024

Related U.S. Application Data

(63) Continuation of application No. PCT/CN2022/081129, filed on Mar. 16, 2022.

(30) Foreign Application Priority Data

Mar. 22, 2021 (CN) .......................... 202110300084.0

(51) Int. Cl.
G06F 1/20 (2006.01)

(52) U.S. Cl.
CPC ........ G06F 1/203 (2013.01); *G06F 2200/203* (2013.01)

(58) Field of Classification Search
CPC .. G02B 6/4261; G02B 6/4269; G02B 6/4246; G02B 6/4201; G02B 6/4284;
(Continued)

(56) References Cited

U.S. PATENT DOCUMENTS 8,911,244 B2 * 12/2014 Elison ................ H05K 7/20409
439/137
10,117,357 B2 * 10/2018 Bai ..................... H05K 7/20536
(Continued)

FOREIGN PATENT DOCUMENTS

| CN | 201038390 Y | 3/2008 |
|---|---|---|
| CN | 203286520 U | 11/2013 |

(Continued)

*Primary Examiner* — Michael A Matey
(74) *Attorney, Agent, or Firm* — Slater Matsil, LLP

(57) ABSTRACT

This application provides a heat dissipation apparatus which includes an accommodating part and a heat dissipator assembly. The accommodating part includes an accommodating cavity for accommodating a heating component. The heating component is plugged into the accommodating cavity along a first direction. The heat dissipator assembly includes a heat dissipator, a support, a sliding component, and a linkage part. The support is fixed to the accommodating part. The heat dissipator is connected to the support by using the sliding component. The accommodating part includes a first side surface and a second side surface that are opposite to each other, and the heat dissipator is located on the first side surface. The sliding component includes an oblique slot and a sliding block. The oblique slot gradually approaches the second side surface of the accommodating part along the first direction.

20 Claims, 7 Drawing Sheets

(58) Field of Classification Search
CPC ........ G02B 6/428; G02B 6/36; G02B 6/4268; H05K 7/2049; H05K 5/0286; H05K 5/0295; H05K 7/20; H05K 7/20418; G06F 1/20; G06F 1/203; G06F 2200/203; G06F 1/183; F28F 2275/08; H04B 10/40
See application file for complete search history.

(56) References Cited

U.S. PATENT DOCUMENTS

| | | | |
|---|---|---|---|
| 10,212,852 B1* | 2/2019 | Reddy | F28F 3/022 |
| 2005/0100292 A1* | 5/2005 | Malagrino | G02B 6/4201 |
| | | | 385/92 |
| 2005/0162834 A1* | 7/2005 | Nishimura | H05K 7/20509 |
| | | | 361/710 |
| 2005/0195565 A1* | 9/2005 | Bright | H05K 7/20418 |
| | | | 361/688 |
| 2005/0215098 A1* | 9/2005 | Muramatsu | H01R 13/6335 |
| | | | 439/159 |
| 2008/0226239 A1* | 9/2008 | Oki | G02B 6/4246 |
| | | | 385/92 |
| 2008/0278914 A1* | 11/2008 | Chen | H05K 5/0295 |
| | | | 361/709 |
| 2009/0296350 A1* | 12/2009 | Oki | G02B 6/4269 |
| | | | 361/709 |
| 2010/0067196 A1* | 3/2010 | Costello | H05K 7/20509 |
| | | | 361/709 |
| 2015/0077937 A1* | 3/2015 | Daly | G02B 6/4268 |
| | | | 361/699 |
| 2017/0269314 A1 | 9/2017 | Gaal | |
| 2018/0123268 A1* | 5/2018 | Leigh | H01R 13/62933 |
| 2022/0052474 A1* | 2/2022 | Chiu | G02B 6/4261 |
| 2023/0034486 A1* | 2/2023 | Scott | H05K 7/20709 |

FOREIGN PATENT DOCUMENTS

| | | |
|---|---|---|
| EP | 4207963 A1 | 7/2023 |
| JP | 2005322498 A | 11/2005 |
| JP | 3132340 U | 6/2007 |
| JP | 2020035198 A | 3/2020 |

* cited by examiner

HEAT DISSIPATION APPARATUS AND COMMUNICATION DEVICE

CROSS-REFERENCE TO RELATED APPLICATIONS

This application is a continuation of International Application No. PCT/CN2022/081129, filed on Mar. 16, 2022, which claims priority to Chinese Patent Application No. 202110300084.0, filed on Mar. 22, 2021. The disclosures of the aforementioned applications are hereby incorporated by reference in their entireties.

TECHNICAL FIELD

This application relates to the field of electronic device technologies, and in particular, to a heat dissipation apparatus and a communication device.

BACKGROUND

Various electronic components are disposed in a communication device. The electronic component includes an electronic component (which is referred to as a heating component for short below) that generates heat or produces heat during working. To ensure normal working of the foregoing heating component, a heat dissipator needs to be used to conduct heat generated by the heating component. When the electronic component is used, some pluggable heating components are usually used. For example, an optical module component needs to be plugged and unplugged in many communication devices, and requires heat dissipation. For another example, some hard disks also need to be plugged and unplugged in a server, and also require heat dissipation.

The optical module is used as an example. In a conventional technology, a heat dissipator is usually mounted above the optical module. Due to a pluggable feature of the optical module, the heat dissipator is usually mounted by using a clip, or mounted in an elastic manner by using a spring screw or the like. In a process in which the optical module is plugged, the optical module needs to overcome a buckling force of the clip or the spring screw to lift the heat dissipator. The buckling force enables the heat dissipator to be attached to the optical module, so as to perform heat dissipation. In the conventional technology, to ensure that the optical module can be plugged into an optical cage of the optical module, the buckling force cannot be set excessively large. Otherwise, a problem that the optical module cannot be plugged or the optical module is damaged may be caused. However, when the buckling force is insufficient, an attachment effect between the heat dissipator and the optical module is poor. As a result, a thermal contact resistance between the optical module and the heat dissipator is large, and a heat dissipation effect of the heat dissipator is poor.

SUMMARY

This application provides a heat dissipation apparatus and a communication device, to reduce a thermal contact resistance between a heat dissipator and a heating component, improve heat transfer performance between the heat dissipator and the heating component, reduce difficulty of an operation of plugging and unplugging the heating component, and help plug and unplug the heating component.

According to a first aspect, this application provides a heat dissipation apparatus. The heat dissipation apparatus is configured to plug a plug-in heating component, and dissipate heat for the heating component. Specifically, the heat dissipation apparatus includes an accommodating part and a heat dissipator assembly. The accommodating part includes an accommodating cavity for accommodating the heating component. The heating component is plugged into the accommodating cavity, and the heating component may be fixed to the accommodating part. For ease of description, a direction along which the heating component is plugged into the accommodating cavity may be considered as a first direction.

The heat dissipator assembly includes a heat dissipator, a support, a sliding component, and a linkage part. The support is fixed to the accommodating part, and the heat dissipator is connected to the support by using the sliding component. The accommodating part includes a first side surface and a second side surface that are opposite to each other along a second direction. The heat dissipator is located on the first side surface of the accommodating part. The second side surface is equivalent to a side surface on a side that is of the accommodating part and that is away from the heat dissipator. The second direction is perpendicular to the first direction. The sliding component includes an oblique slot and a sliding block. The oblique slot gradually approaches the second side surface of the accommodating part along the first direction. Therefore, under a guidance effect of the oblique slot, when the heat dissipator moves to the first direction, the heat dissipator simultaneously moves to a direction close to the second side surface, that is, the heat dissipator may move downward obliquely. One end of the linkage part is mounted on the heat dissipator, and the other end is located in the accommodating cavity. As the heating component is plugged into the accommodating cavity, the heating component may trigger the linkage part, so that the linkage part drives the heat dissipator to move along the first direction. In this case, the sliding block slides relative to the oblique slot, to drive the heat dissipator to move toward the second side surface, in other words, drive the heat dissipator to move toward a direction close to the heating component. When the heating component is completely plugged into the accommodating part, the heat dissipator is attached to the heating component. In this solution, when the heating component is not plugged into the accommodating part, a spacing between the heat dissipator and the second side surface is large, and may even be greater than a thickness of the heating component along the second direction. Horizontal friction is not easily generated between the heating component and the heat dissipator. In this case, the heating component may be easily plugged into the accommodating part. This reduces difficulty of an operation of plugging and unplugging the heating component, and helps a user plug and unplug the heating component. When the heating component is completely plugged into the accommodating part, the heat dissipator and the heating component may be closely attached. This helps reduce a thermal contact resistance between the heat dissipator and the heating component, and improve heat transfer performance between the heat dissipator and the heating component.

When the sliding component is specifically disposed, the oblique slot may be disposed on the heat dissipator, and the sliding block is disposed on the support. Alternatively, in another embodiment, the oblique slot is disposed on the support, and the sliding block is disposed on the heat dissipator. A specific manner of disposing the sliding component is not limited in this application. In addition, a cross section of the sliding block may be a circle, an ellipse, a polygon, or the like. This is also not limited in this application.

The accommodating part and the support of the heat dissipation apparatus may be of an integrated structure. For example, a craft such as sheet metal or injection molding may be used, so that the accommodating part and the support form an integrated frame structure. Alternatively, in a manner such as welding, riveting, threaded connection, or clamping, the accommodating part and the support are fixedly connected to form an integrated structure.

When the heat dissipation apparatus is specifically disposed, a first resetting member may further be disposed between the heat dissipator and the support. The first resetting member has a resetting force along the second direction. Specifically, when the heating component is unplugged from the accommodating cavity, the first resetting member is configured to drive the heat dissipator to move toward a direction away from the second side surface. In this solution, under action of the first resetting member, when the heating component is unplugged from the accommodating part, the heat dissipator may move toward the direction away from the second side surface. Specifically, in other words, the heat dissipator moves along the oblique slot to the direction away from the second side surface. Therefore, when the heating component is plugged or unplugged, the spacing between the heat dissipator and the second side surface is large, to reduce difficulty of plugging or unplugging the heating component.

In another technical solution, the heat dissipation apparatus may further include a second resetting member disposed between the heat dissipator and the support. The second resetting member has a resetting force away from the first direction. Specifically, when the heating component is unplugged from the accommodating cavity, the second resetting member is configured to drive the heat dissipator to move away from the direction along which the heating component is plugged. In this solution, under action of the second resetting member, when the heating component is unplugged from the accommodating part, the heat dissipator may move toward the direction away from the second side surface. Specifically, in other words, the heat dissipator moves along the oblique slot to the direction away from the second side surface. Therefore, when the heating component is plugged or unplugged, the spacing between the heat dissipator and the second side surface is large, to reduce the difficulty of plugging or unplugging the heating component.

In a specific embodiment, only the first resetting member or the second resetting member may be disposed for the heat dissipation apparatus. Alternatively, both the first resetting member and the second resetting member may be disposed. The first resetting member may be an elastic structure such as a spring, an elastic strip, or a spring plate, or may be a drive structure, such as a lever, that needs to be configured with a drive apparatus. This is not limited in this application. Similarly, the second resetting member may also be an elastic structure such as a spring, an elastic strip, or a spring plate, or may be a drive structure, such as a lever, that needs to be configured with a drive apparatus. This is not limited in this application.

In another technical solution, the second resetting member may be an elastic heat conducting strip. One end of the elastic heat conducting strip is connected to the heat dissipator, and the other end is connected to the support. The elastic heat conducting strip may conduct heat of the heat dissipator, to improve a heat dissipation effect of the heat dissipation apparatus.

To further improve the heat dissipation effect of the heat dissipation apparatus, the support connected to the elastic heat conducting strip is a heat conducting part of the support. In this case, the heat may further be conducted to the heat conducting part, to further increase a heat dissipation area, and improve the heat dissipation effect of the heat dissipation apparatus.

A surface that is of the heat dissipator and that is attached to the heating component further includes a flexible heat conducting layer. The flexible heat conducting layer is flexible to some extent, and can be tightly filled between the heat dissipator and the heating component. In this way, a thermal connection effect between the heat dissipator and the heating component is better, to reduce a thermal resistance, and further improve a heat dissipation effect of the heat dissipation apparatus on the heating component.

In addition, a heat conducting protrusion is at a position that is of the heat dissipator and that is attached to the heating component. When the heating component is completely plugged into the accommodating cavity, the heat conducting protrusion is attached to the heating component. In this solution, a probability of structural interference can be reduced, to help improve an integration degree of the heat dissipation apparatus.

When the sliding component is specifically disposed, the heat dissipation apparatus may include a plurality of groups of sliding components. The plurality of groups of sliding components are symmetrically disposed on two sides of the heat dissipator, and a symmetry axis of the plurality of groups of sliding components is parallel to the first direction. In this solution, the plurality of groups of sliding components are disposed, so that a sliding process of the heat dissipator is stable.

A specific structure of the linkage part is not limited. In a specific technical solution, the linkage part may be a fixed protrusion. The fixed protrusion is fixed on a surface that is of the heat dissipator and that faces a direction of the second side surface. The fixed protrusion extends into the accommodating part. When the heating component is plugged into the accommodating part, the heating component abuts against the fixed protrusion, to drive the fixed protrusion to move along the first direction. The heat dissipator is further driven to move toward the heating component, so that the heat dissipator abuts against the heating component.

The fixed protrusion may be fixedly mounted on the heat dissipator, for example, connected and fixed in a manner such as welding, riveting, or clamping. Alternatively, the fixed protrusion and the heat dissipator may be of an integrated structure, to simplify a structure of the heat dissipator assembly and simplify an assembly craft of the heat dissipation apparatus.

The heating component includes an abutment part that abuts against the fixed protrusion, and is located at an end part that is of the heating component and that faces the first direction. When the heating component is completely plugged into the accommodating cavity, the abutment part abuts against the fixed protrusion. In this solution, the heating component can be protected, so that the fixed protrusion does not damage the heating component. This ensures a useful life of the heating component. For example, the abutment part includes a structure such as a steel sheet or a steel block.

A specific quantity of accommodating parts in the heat dissipation apparatus is not limited. For example, the heat dissipation apparatus may include at least two accommodating parts. In the at least two accommodating parts, a heat dissipator assembly may be correspondingly disposed for a part of the accommodating parts, and no heat dissipator assembly is disposed for a part of the accommodating parts. Alternatively, one heat dissipator assembly is correspondingly disposed for each accommodating part. This is not limited in this application. Specifically, selection may be performed based on an actual application scenario of the heat dissipation apparatus.

When the at least two accommodating parts are specifically disposed, the at least two accommodating parts may be arranged side by side along a third direction. The third direction is perpendicular to the first direction, and the third direction is perpendicular to the second direction. Alternatively, the at least two accommodating parts may be disposed along the second direction in a stacking manner. In this case, the heat dissipator assembly may be disposed in an area between the accommodating parts. Certainly, alternatively, one heat dissipator assembly may be correspondingly disposed for each accommodating part.

In the technical solution of this application, a specific arrangement manner of the at least two accommodating parts and corresponding disposing of the heat dissipator assembly may be selected based on an actual product requirement. This is not limited in this application.

When the heat dissipation apparatus includes at least two accommodating parts, adjacent accommodating parts are fixed to form an integrated structure. In other words, the at least two accommodating parts may be designed as an integrated structure. The integrated structure herein may be an integrally formed structure, or may be an integrated structure obtained through connection in a manner such as welding, clamping, or threaded connection. This is not limited in this application. In this solution, a distance between the accommodating parts is small. This helps improve the integration degree of the heat dissipation apparatus, and helps improve overall strength of the heat dissipation apparatus, so that the heat dissipation apparatus is not easily deformed.

Certainly, in another embodiment, the accommodating parts may be disposed separately. In other words, a position of the accommodating part may be arranged based on a position at which the heating component is actually disposed.

When the heat dissipation apparatus includes at least two heat dissipator assemblies, supports of the at least two heat dissipator assemblies may be of an integrated structure, to improve integrity of the heat dissipation apparatus and simplify the assembly craft of the heat dissipation apparatus. Alternatively, adjacent parts of the supports of the at least two heat dissipator assemblies may be of an integrated structure. For example, when the support includes two side panels opposite to each other along the third direction, the heat dissipator is located between the two side panels, and adjacent side panels of two adjacent heat dissipators are of an integrated structure, so that a structure of the heat dissipation apparatus is simplified. Alternatively, when the support further includes a tail support, tail supports of heat dissipator assemblies may be of an integrated structure.

In addition, when the at least two accommodating parts are disposed in a row along the third direction, the support includes side panels located on two sides of the heat dissipator that are along the third direction. Side panels of two adjacent heat dissipators are fixedly connected to the accommodating part by using a buckle. It may be considered that the accommodating part includes a fixing part, and the side panel is fixed to the fixing part by using the buckle, so that the heat dissipator assembly is fixedly mounted on the accommodating part.

According to a second aspect, this application further provides a communication device. The communication device includes a heating component and the heat dissipation apparatus in any one of the foregoing technical solutions. The heating component is plugged into the accommodating part of the heat dissipation apparatus. In this solution, a heat dissipation effect of the heating component is good, to help improve a working effect and a useful life of the heating component. In addition, a process of plugging and unplugging the heating component is easy.

In a specific embodiment, a specific type of the heating component is not limited in this application. For example, the heating component includes any type such as an optical module, a chip, a circuit module, or a card module.

BRIEF DESCRIPTION OF THE DRAWINGS

Figure 1:
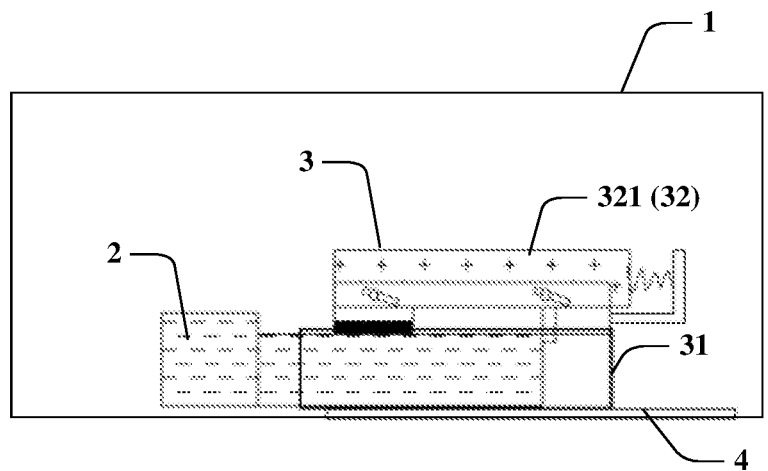
FIG. 1 is a schematic diagram of a partial structure of a communication device according to an embodiment of this application.

1—Housing; 2—Heating component;
3—Heat dissipation apparatus; 31—Accommodating part;
311—First side surface; 312—Second side surface;
32—Heat dissipator assembly; 321—Heat dissipator;
3211—Flexible heat conducting layer; 3212—Heat conducting protrusion;
3213—Liquid inlet; 3214—Liquid outlet;
322—Support; 3221—Support body;
3222—Tail support; 3223—Side panel;
323—Sliding component; 3231—Oblique slot;
3232—Sliding block; 324—Linkage part;

325—First resetting member; 326—Second resetting member;
327—Elastic strip; 4—circuit board; and
5—Buckle.

DETAILED DESCRIPTION OF ILLUSTRATIVE EMBODIMENTS

Terms used in the following embodiments are merely intended to describe specific embodiments, but are not intended to limit this application. The terms "one", "a", and "this" of singular forms used in this specification and the appended claims of this application are also intended to include expressions such as "one or more", unless otherwise specified in the context clearly.

Reference to "an embodiment", "a specific embodiment", or the like described in this specification indicates that one or more embodiments of this application include a specific feature, structure, or characteristic described with reference to the embodiment. The terms "include", "have", and their variants all mean "include but are not limited to", unless otherwise specifically emphasized in another manner.

In a communication device, heat dissipation of a plug-in heating component is increasingly concerned. An existing plug-in heating component includes various types, including an optical module, a chip, a circuit module, a card module, or the like. However, for heat dissipation of the plug-in heating components, a conventional heat dissipation apparatus still has a problem of a large thermal resistance, a poor heat dissipation effect, or inconvenient plugging or unplugging, and cannot satisfy a requirement. Because problems of the heat dissipation of the plug-in heating components are the same or similar, for ease of description, the following mainly uses an optical module as an example to describe in detail a heat dissipation problem of the existing heating component. It should be understood that another related or similar heating component that requires heat dissipation also has a same or similar problem.

Currently, in a network communication service, an optical module is an integrated module for mutual conversion between an optical signal and an electrical signal, plays an important role in an optical fiber communication process, and is widely applied. The optical module generates much heat when being used in optical fiber communication. To ensure normal running of the optical module, the heat generated by the optical module needs to be conducted and dissipated in a timely manner. With development of communication technologies, communication is accelerated, a density of service ports increases, and a communication rate of the optical module continuously increases. In addition, the optical module occupies less space, power consumption of the optical module continuously increases, and the optical module generates more heat. Therefore, a requirement of the optical module on heat dissipation is increasingly high. In particular, it is very important to resolve a heat dissipation problem of a high-power optical module in small space.

In a conventional technology, for a heat dissipation manner of a high-power pluggable heating component, a heat dissipator and a metal housing of the heating component are attached and closely pressed by using a clip. At an attachment position (dry contact position) between the heat dissipator and the heating component, because outer surfaces of the heat dissipator and the heating component both have a flatness tolerance and manufacturing roughness, the heat dissipator and the heating component are not closely attached. Microscopically, local points between contacting metals contact. There is a gap between contacting surfaces, and a large amount of air exists in the gap. As a result, a problem such as a large thermal resistance between the heat dissipator and the heating component, poor heat conduction, a poor heat dissipation capability, or the like is caused. In addition, there is a phenomenon that a contacting pressure is unstable or uncontrollable between an existing heat dissipator and heating component. As a result, contact between the heat dissipator and the heating component is poor, and heat dissipation performance is affected.

In view of this, technical solutions of embodiments of this application provide a heat dissipation apparatus and a communication device including the heat dissipation apparatus, to reduce a thermal contact resistance between a heat dissipator and a heating component, improve heat transfer performance between the heat dissipator and the heating component, reduce difficulty of plugging and unplugging, and help plug and unplug the heating component.

The heat dissipation apparatus and the communication device including the heat dissipation apparatus in this application are further described in detail below by using a specific embodiment and with reference to the accompanying drawings. It should be noted that, in embodiments of this application, a same reference numeral indicates a same component or a same part. For same parts in embodiments of this application, only one part or component marked with a reference numeral may be used as an example in the figure. It should be understood that the reference numeral is also applicable to another same part or component.

FIG. 1 is a schematic diagram of a partial structure of a communication device according to an embodiment of this application. As shown in FIG. 1, the communication device includes a housing 1, a heating component 2, and a heat dissipation apparatus 3. The heating component 2 and the heat dissipation apparatus 3 are disposed on the housing 1. Certainly, the heating component 2 and the heat dissipation apparatus 3 are not necessarily directly connected. For example, the heat dissipation apparatus 3 may be fixed to a circuit board 4, and the heating component 2 is plugged into the heat dissipation apparatus 3, so that the heating component 2 is electrically connected to the heat dissipation apparatus 3. The heating component 2 and the heat dissipation apparatus 3 may be disposed on the housing 1 by using the circuit board 4. The heat dissipation apparatus 3 includes an accommodating part 31 for accommodating the heating component 2, and the heating component 2 is plugged into the accommodating part 31 of the heat dissipation apparatus 3. Therefore, a heat dissipator 321 of the heat dissipation apparatus 3 dissipates heat for the heating component 2, to ensure normal working of the heating component 2.

It should be noted that, in the technical solutions of this application, a specific type of the communication device is not limited in this application, and a device that can perform signal transmission may be referred to as the communication device. For example, the communication device may include a computing device (for example, a server), a network device (for example, a switch), a storage device (for example, a storage array), or a vehicle-mounted device (for example, a vehicle-mounted sound box or a vehicle-mounted navigator). A communication device including a plug-in heating component falls within the protection scope of the technical solutions of this application.

Specifically, the heating component 2 is a pluggable or plug-in heating component 2. The heating component 2 can be plugged into the accommodating part 31 of the heat dissipation apparatus 3, and can be unplugged from the accommodating part 31. A specific structure of the heat dissipation apparatus 3 is described in detail below with reference to the accompanying drawings, and details are not described herein. In the communication device, the unique heat dissipation apparatus 3 is disposed, so that a heat dissipation effect of the heating component 2 can be improved, and a heat dissipation requirement of the heating component 2 can be satisfied. In addition, plugging and unplugging are convenient and labor-saving, and the heating component 2 is easily plugged and unplugged.

It should be noted that, in this embodiment of this application, specific positions of the heat dissipation apparatus 3 and the heating component 2 in the communication device, connections between the heat dissipation apparatus 3 and the heating component 2 and another component, or the like are not limited. Therefore, details are not described herein. In addition, a person skilled in the art understands that, to provide a required function for a user, the communication device may include a plurality of components disposed inside the device. This is not particularly limited in this application. A person skilled in the art may adjust a position, a specific structure, or the like of each component based on an actual requirement.

In a specific embodiment, a type of the heating component 2 is not limited, and the heating component 2 may be any electronic component that produces heat. In other words, the heat dissipation apparatus 3 may adapt to different heating components 2 for heat dissipation, and product universality is good, so that heat dissipation optimization problems of different modules can be resolved. In addition, the heat dissipation apparatus 3 may further satisfy heat dissipation requirements of modules of different sizes, without affecting universality of a heat dissipation structure, and only a size of the heat dissipation apparatus 3 needs to be properly adjusted. Specifically, in some embodiments, the heating component 2 may be a heating component 2 such as an optical module, a chip (which is also referred to as a chip card), a card module (which also referred to as a card), or a circuit module. The heat dissipation apparatus 3 in this technical solution of this application can alleviate a problem that is of many existing types of heating components 2 and that a thermal resistance is large, a heat dissipation effect is poor, a plugging and unplugging resistance is large, and plugging and unplugging are inconvenient during heat dissipation.

By using the heat dissipation apparatus 3 provided in this embodiment of this application, a specific structure of the heating component 2 does not need to be improved. In other words, a problem that is of some existing plug-in heating component 2 and that a thermal resistance is large, a heat dissipation effect is poor, a plugging and unplugging resistance is large, and plugging and unplugging are inconvenient during heat dissipation can be alleviated. In addition, the heat dissipation apparatus 3 has good universality and high flexibility, and is applicable to heat dissipation requirements of different modules, without affecting the universality of the heat dissipation structure.

It should be noted that the heating component 2 shown in the accompanying drawings of embodiments of this application may be an optical module, but is not limited thereto. A structural principle of the heat dissipation apparatus 3 may alternatively be implemented in any other type of heating component 2 that is properly arranged, such as a chip, a card, or a circuit module. The following describes the heat dissipation apparatus 3 and the heating component 2 in detail with reference to the accompanying drawings. A person skilled in the art will understand that a principle of the present invention is applicable to any properly arranged heating component 2. In addition, for clarity and brevity, descriptions of a well-known function and structure may be omitted.

Figure 2:
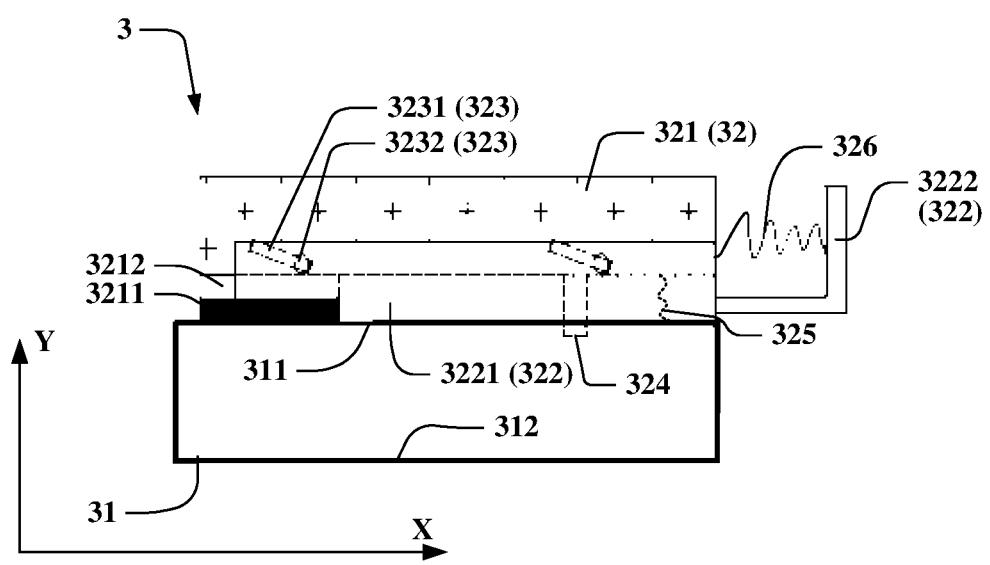
FIG. 2 is a schematic diagram of a structure of a heat dissipation apparatus on a side surface according to an embodiment of this application.
Figure 3:
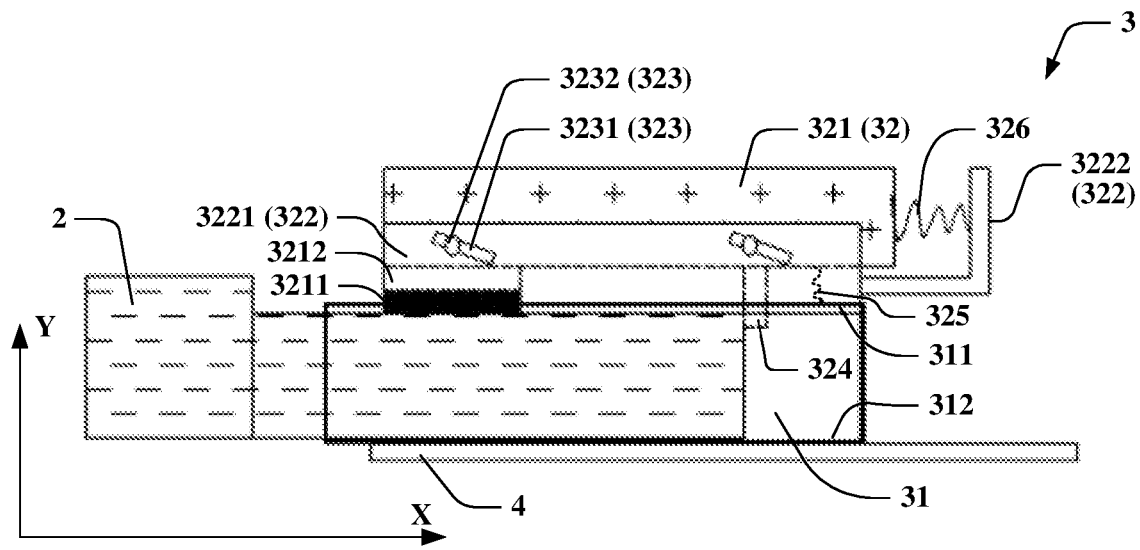
FIG. 3 is a schematic diagram of a first structure of a heat dissipation apparatus on a side surface during usage according to an embodiment of this application.

FIG. 2 is a schematic diagram of a structure of a heat dissipation apparatus according to an embodiment of this application. FIG. 3 is a schematic diagram of a first structure of a heat dissipation apparatus on a side surface during usage according to an embodiment of this application. As shown in FIG. 2 and FIG. 3, an embodiment of this application provides a heat dissipation apparatus 3, configured to dissipate heat for a heating component 2, and particularly applicable to heat dissipation for a pluggable heating component 2. The heat dissipation apparatus 3 includes an accommodating part 31 and a heat dissipator assembly 32. The accommodating part 31 includes an accommodating cavity for accommodating the heating component 2. The heating component 2 is plugged into the accommodating cavity along a first direction X. In other words, the first direction X mentioned in this embodiment of this application is a plugging direction of the heating component 2. The accommodating part 31 may be specifically a structure such as a card slot, a slot, an accommodating groove, or an optical cage. This is not limited in this application.

As shown in FIG. 3, the heat dissipator assembly 32 includes a heat dissipator 321, a support 322, a sliding component 323, and a linkage part 324. The heat dissipator 321 is connected to the support 322 in a sliding manner by using the sliding component 323, and the support 322 is fixed to the accommodating part 31, so that the heat dissipator 321 can dissipate heat for the heating component 2. The accommodating part 31 includes a first side surface 311 and a second side surface 312 that are opposite to each other along a second direction Y. The heat dissipator 321 is located on the first side surface 311. The second direction Y is perpendicular to the first direction X. It is noted that the first side surface 311 and the second side surface 312 are not necessarily specific structures, and mainly refer to a position relationship herein. In other words, along the second direction Y, a side that is of the accommodating part 31 and that faces the heat dissipator 321 is the first side surface 311, and a side that is away from the heat dissipator 321 is the second side surface 312. The heating component 2 may be located between the first side surface 311 and the second side surface 312. In a state shown in FIG. 3, the second side surface 312 may be understood as a bottom surface of the accommodating part 31, and the first side surface 311 may be understood as a top surface of the accommodating part 31. Specifically, the sliding component 323 includes an oblique slot 3231 and a sliding block 3232. The sliding block 3232 and the oblique slot 3231 are adaptive, and are connected in a sliding manner. In other words, the sliding block 3232 may slide in the oblique slot 3231 relative to the oblique slot 3231, to drive the heat dissipator 321 to move along an extension direction of the oblique slot 3231 and relative to the support 322. When the oblique slot 3231 is specifically disposed, the oblique slot 3231 gradually approaches the second side surface 312 along the first direction X. In other words, the oblique slot 3231 tilts downward along the plugging direction of the heating component 2. Therefore, when the sliding block 3232 slides in the oblique slot 3231 toward the first direction X, the heat dissipator 321 may move toward the second side surface 312, and gradually approach the heating component 2 inside the accommodating part 31.

One end of the linkage part 324 of the heat dissipator assembly 32 is mounted on the heat dissipator 321, and the other end is located in the accommodating cavity. When the heating component 2 is plugged into the accommodating cavity, the linkage part 324 is triggered. The linkage part 324 drives the heat dissipator 321 to move along the first direction X, so that the sliding block 3232 of the sliding component 323 slides relative to the oblique slot 3231. The heat dissipator 321 is driven to move toward the second side surface 312, and the heat dissipator 321 gradually approaches the heating component 2 located in the accommodating part 31. By properly setting a structure and a size of the linkage part 324, when the heating component 2 is completely plugged into the accommodating part 31, the heat dissipator 321 is attached to the heating component 2.

In this technical solution of this application, the heat dissipation apparatus 3 may have a guidance effect on a movement of the heat dissipator 321 by using the oblique slot 3231. The linkage part 324 is disposed, so that the heat dissipator 321 may move with plugging of the heating component 2. In this way, in a plugging process of the heat dissipator 321, the linkage part 324 drives the heat dissipator 321 to move, and the heat dissipator 321 moves downward obliquely under guidance of the oblique slot 3231. In other words, when the heating component 2 is just plugged into the accommodating part 31, there is a gap between the heat dissipator 321 and the heating component 2 (or friction is small). As the heating component 2 is plugged, the gap between the heat dissipator 321 and the heating component 2 becomes smaller until the heat dissipator 321 contacts the heating component 2. Therefore, compared with a conventional technology, in this solution, sliding friction between the heating component 2 and the heat dissipator 321 in a movement process can be reduced, so that plugging and unplugging are more labor-saving and convenient. In addition, in this solution, a problem that the heating component 2 cannot be plugged into the accommodating part 31, or the heating component 2 is damaged due to large friction in the plugging process of the heating component 2 does not need to be considered. In this way, the heat dissipator 321 may move downward obliquely as the heating component 2 is plugged. The heat dissipator 321 is attached to the heating component 2 with a large pressure under cooperation between the sliding component 323 and the linkage part 324. In this way, the heat dissipator 321 is closely abutted against, closely attached to, or closely in contact with a surface of the heating component 2, to reduce thermal contact resistance between the heat dissipator 321 and the heating component 2, improve heat transfer performance between the heat dissipator 321 and the heating component 2, improve a heat dissipation capability, and improve a heat dissipation effect of the heating component 2.

Therefore, the support 322, the sliding component 323, and the linkage part 324 are disposed in the heat dissipation apparatus 3 in a cooperation manner, so that the heat dissipator 321 is closely contacts the surface of the heating component 2. This effectively reduces the thermal contact resistance between the heat dissipator 321 and the heating component 2 and improves the heat transfer performance between the heat dissipator 321 and the heating component 2. Heat is more effectively dissipated for the heating component 2. In addition, in a process of plugging and unplugging the heating component 2, there is no sliding friction movement on a heat conducting bonding surface of the heat dissipator 321 and the heating component 2, so that plugging and unplugging are smooth and labor-saving, and a contacting pressure is stable and controllable.

When the sliding component 323 is specifically disposed, in an embodiment, the oblique slot 3231 may be disposed on the heat dissipator 321, and the sliding block 3232 is disposed on the support 322. Alternatively, in another embodiment, the oblique slot 3231 may be disposed on the support 322, and the sliding block 3232 is disposed on the heat dissipator 321. In conclusion, one of the oblique slot 3231 and the sliding block 3232 is disposed on the heat dissipator 321, and the other is disposed on the support 322, provided that the heat dissipator 321 may move obliquely by using a sliding connection between the oblique slot 3231 and the sliding block 3232 of the sliding component 323. Specific positions at which the oblique slot 3231 and the sliding block 3232 are disposed are not limited in this application.

Still refer to FIG. 3. The heat dissipation apparatus 3 may further include a first resetting member 325. The first resetting member 325 is disposed between the heat dissipator 321 and the support 322. When the heating component 2 is unplugged from the accommodating cavity, the first resetting member 325 is configured to drive the heat dissipator 321 to move toward a direction away from the second side surface 312. In other words, the first resetting member 325 may provide the heat dissipator 321 with a force along the second direction Y and toward the direction away from the second side surface 312. The first resetting member 325 may drive the heat dissipator 321 to move along the second direction Y toward a direction away from the heating component 2, so that the sliding block 3232 slides relative to the oblique slot 3231. When the heating component 2 is not plugged into the accommodating part 31, there is a spacing between the heat dissipator 321 and the second side surface 312, so that the heating component 2 can be smoothly plugged into the accommodating part 31. When the heating component 2 is unplugged from the accommodating part 31, the first resetting member 325 drives the heat dissipator 321 to be separated from the heating component 2, so that the heating component 2 can be smoothly unplugged from the accommodating part 31.

In a specific embodiment, the first resetting member 325 may be an elastic member such as a spring. When the heating component 2 is completely plugged into the accommodating part 31, the elastic member is in an energy storage state. When the heating component 2 is unplugged from the accommodating part 31, the elastic member releases energy, to drive the heating component 2 to move toward the direction away from the second side surface 312. A structure of the first resetting member 325 in this solution is simple. Certainly, in another embodiment, the first resetting member 325 may alternatively be a structure such as a lever. This is not listed one by one herein.

Still refer to FIG. 3. In addition, the heat dissipation apparatus 3 may further include a second resetting member 326. The second resetting member 326 is disposed between the heat dissipator 321 and the support 322. When the heating component 2 is unplugged from the accommodating cavity, the second resetting member 326 is configured to drive the heat dissipator 321 to move away from the first direction X. In other words, the second resetting member 326 may provide the heat dissipator 321 with a force along a direction of unplugging the heating component 2. The second resetting member 326 drives the heat dissipator 321 to move toward a direction in which the heating component 2 is unplugged, so that the sliding block 3232 slides relative to the oblique slot 3231. When the heating component 2 is not plugged into the accommodating part 31, there is a spacing between the heat dissipator 321 and the second side surface 312, so that the heating component 2 can be smoothly plugged into the accommodating part 31. When the heating component 2 is unplugged from the accommodating part 31, the second resetting member 326 drives the heat dissipator 321 to be separated from the heating component 2, so that the heating component 2 can be smoothly unplugged from the accommodating part 31.

In a specific embodiment, the support 322 includes a support body 3221 and a tail support 3222. The sliding component 323 is connected between the support body 3221 and the heat dissipator 321. The second resetting member 326 is connected between the heat dissipator 321 and the tail support 3222. This is not limited in this application. Specifically, the tail support 3222 and the support body 3221 may be of an integrated structure. Alternatively, the tail support 3222 may be fixedly connected to the support body 3221. For example, in the embodiment shown in FIG. 2, the tail support 3222 is fixedly connected to the support body 3221. For example, the tail support 3222 may be fixedly connected to the support body 3221 in a manner such as welding, riveting, clamping, or threaded connection. Alternatively, the tail support 3222 and the support body 3221 may be of a split structure, and the tail support 3222 may be fixed to the accommodating part 31. Certainly, the tail support 3222 may also be fixedly connected to the support body 3221 in a manner such as welding, riveting, clamping, or threaded connection.

In a specific embodiment, the second resetting member 326 may be an elastic member such as a spring plate. When the heating component 2 is completely plugged into the accommodating part 31, the elastic member is in an energy storage state. When the heating component 2 is unplugged from the accommodating part 31, the elastic member releases energy, to drive the heating component 2 to move toward the direction away from the second side surface 312. A structure of the second resetting member 326 in this solution is simple. In another embodiment, the second resetting member 326 may alternatively be a structure such as a lever. This is not listed one by one herein.

Figure 4:
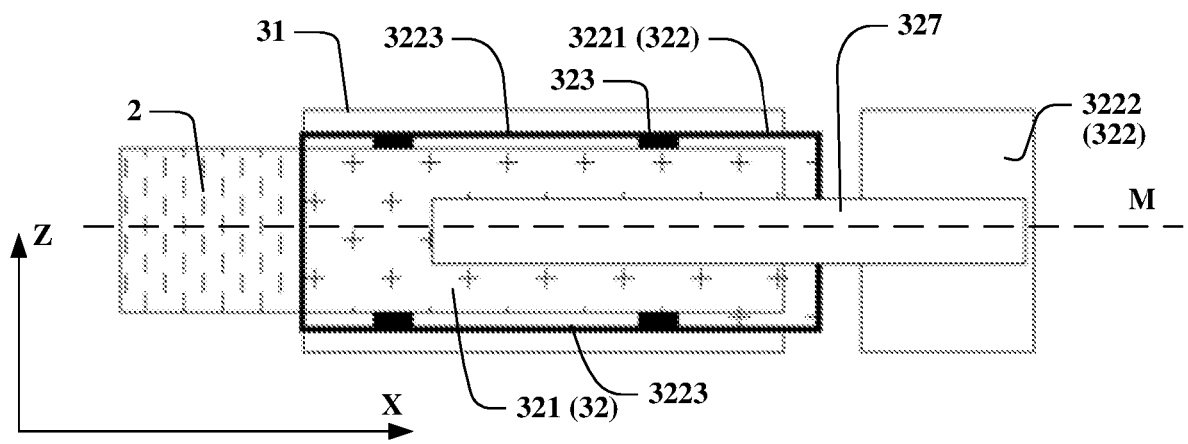
FIG. 4 is a schematic diagram of a first structure of a heat dissipation apparatus on a top view during usage according to an embodiment of this application.
Figure 5:
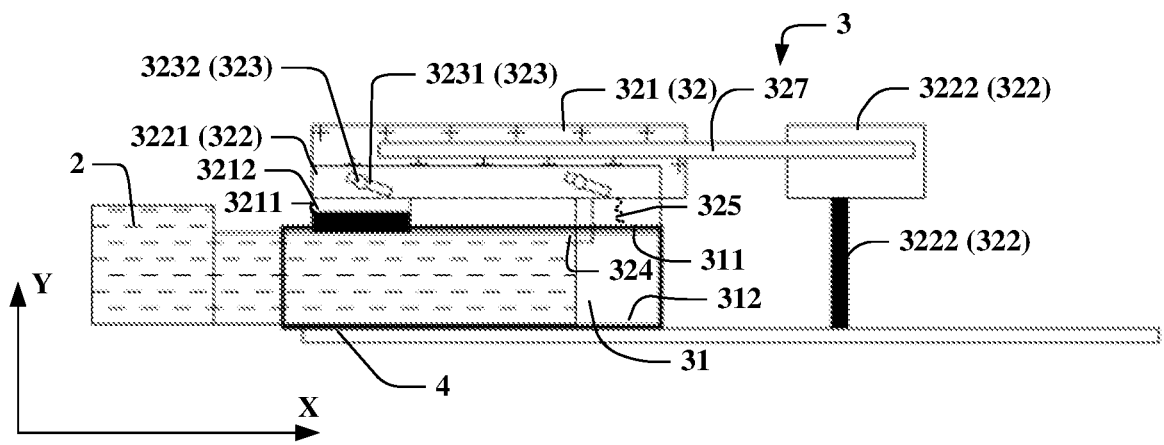
FIG. 5 is a schematic diagram of a second structure of a heat dissipation apparatus on a side surface during usage according to an embodiment of this application.

FIG. 4 is a schematic diagram of a first structure of a heat dissipation apparatus on a top view during usage according to an embodiment of this application. FIG. 5 is a schematic diagram of a second structure of a heat dissipation apparatus on a side surface during usage according to an embodiment of this application. As shown in FIG. 4 and FIG. 5, in this embodiment of this application, the heat dissipation apparatus 3 may further include an elastic strip 327. The elastic strip 327 serves as a resetting member. One end is connected to the heat dissipator 321, and the other end is connected to the support 322. The elastic strip 327 may provide the heat dissipator 321 with a force along an extension direction of the oblique slot 3231. Specifically, the force may be understood as a force that is obliquely upward, so that the sliding block 3232 slides relative to the oblique slot 3231. The elastic strip 327 may directly reset the heat dissipator 321 to a position that is obliquely upward, in other words, a position at which the sliding block 3232 abuts against an upper part of the oblique slot 3231. The resetting force of the elastic strip 327 extends along the direction of the oblique slot 3231, so that friction between the sliding block 3232 and the oblique slot 3231 can be reduced, abrasions of the sliding block 3232 and the oblique slot 3231 are reduced, and a useful life of the sliding component 323 is increased. When the heating component 2 is not plugged into the accommodating part 31, the elastic strip 327 may cause a spacing between the heat dissipator 321 and the second side surface 312, so that the heating component 2 can be smoothly plugged into the accommodating part 31. When the heating component 2 is unplugged from the accommodating part 31, the elastic strip 327 drives the heat dissipator 321 to be separated from the heating component 2, so that the heating component 2 can be smoothly unplugged from the accommodating part 31.

Specifically, the elastic strip 327 may be an elastic heat conducting strip. One end of the elastic heat conducting strip is connected to the heat dissipator 321, and the other end is connected to the support 322. In this solution, the elastic heat conducting strip is connected to the heat dissipator 321 to dissipate heat of the heat dissipator 321, so as to improve the heat dissipation effect of the heat dissipator 321.

Still refer to FIG. 4 and FIG. 5. In a specific embodiment, one end of the elastic heat conducting strip is connected to a surface of the heat dissipator 321, and the other end is connected to the tail support 3222 of the support 322. The tail support 3222 may alternatively be a heat conducting tail support 3222. In other words, the other end of the elastic heat conducting strip is connected to a heat conducting part of the support 322. Therefore, heat of the heat dissipator 321 may be transferred to the heat conducting tail support 3222 of the support 322 by using the elastic heat conducting strip, to further improve a heat dissipation area, and improve the heat dissipation effect of the heat dissipator 321.

To improve heat transfer efficiency between the heat dissipator 321 and the heating component 2, reduce a thermal resistance, and improve the heat dissipation capability, at least a surface that is of the heat dissipator 321 and that is attached to the heating component 2 includes a flexible heat conducting layer 3211. The flexible heat conducting layer 3211 may be fixed to the surface of the heat dissipator 321 in a bonding manner. The flexible heat conducting layer 3211 may enable the heat dissipator 321 to be closely attached to the heating component 2, to help heat transfer.

The flexible heat conducting layer 3211 is disposed on the heat dissipator 321. In a process of plugging and unplugging the heating component 2, if there is large horizontal friction between the heating component 2 and the heat dissipator 321, the flexible heat conducting layer 3211 is easily punctured or worn. In addition, the flexible heat conducting layer 3211 is easily wrinkled, and an attachment effect between the heat dissipator 321 and the heating component 2 is reduced. In addition, if a positive pressure of attachment between the heat dissipator 321 and the heating component 2 is small, the flexible heat conducting layer 3211 has poor filling performance and a limited heat conducting capability, and still cannot fully exert a flexible effect of the flexible heat conducting layer 3211. In addition, a friction coefficient of the flexible heat conducting layer 3211 is large. A friction resistance of the heating component 2 is large when the heating component 2 is plugged and unplugged, a force for plugging and unplugging the heating component 2 is large, and plugging and unplugging are laborious. However, when the technical solution of this application is used, the heat dissipator 321 moves toward the heating component 2 only as the heating component 2 is plugged, so that the heat dissipator 321 contacts the heating component 2. In this case, in a process of plugging the heating component 2, excessively large horizontal friction is not easily generated between the heat dissipator 321 and the heating component 2. In other words, the horizontal friction is not easily generated between the heat dissipator 321 and the flexible heat conducting layer 3211, thereby reducing a probability that the flexible heat conducting layer 3211 is worn, and helping plug the heating component 2 into the accommodating pall 31. In addition, when the heating component 2 is completely plugged into the accommodating part 31 of the heat dissipation apparatus 3, the positive pressure between the heat dissipator 321 and the heating component 2 may be large. In this way, the flexible heat conducting layer 3211 may have good filling performance and a good heat conducting capability, so that the thermal resistance can be further reduced, and the heat dissipation effect is improved.

Refer to FIG. 5. The heat dissipator 321 further includes a heat conducting protrusion 3212. When the heating component 2 is completely plugged into the accommodating cavity, the heat conducting protrusion 3212 is attached to the heating component 2. In this solution, specifically, the heat conducting protrusion 3212 may be attached to a heating part of the heating component 2, so that heat generated by the heating component 2 is dissipated. The heat conducting protrusion 3212 is disposed to reduce structural interference between the heat dissipator 321 and the accommodating part 31, and help increase the heat dissipation area of the heat dissipator 321.

To attach the heat conducting protrusion 3212 to the heating component 2, the first side surface 311 of the accommodating part 31 further includes an opening. Therefore, the heat conducting protrusion 3212 extends into the opening, so that the heat conducting protrusion 3212 is attached to the heating component 2. When the opening is specifically disposed, an area of the opening is greater than an area of the heat conducting protrusion 3212, to help the heat dissipator 321 move along the first direction X.

Still refer to FIG. 5. When the linkage part 324 of the heat dissipation apparatus 3 is specifically disposed, the linkage part 324 may be a fixed protrusion. The fixed protrusion is fixed on a surface that is of the heat dissipator 321 and that faces a direction of the second side surface 312. When the heat dissipator 321 includes the heat conducting protrusion 3212, a height of the fixed protrusion is greater than a height of the heat conducting protrusion 3212. When the heating component 2 is plugged into the accommodating part 31, an end part that is of the heating component 2 and that faces the first direction X may abut against the fixed protrusion, to drive the heat dissipator 321 to move toward the first direction X. In this solution, reliability of a structure of the fixed protrusion is high. Therefore, when the heating component 2 is completely plugged into the accommodating part 31, the heating component 2 may provide the heat dissipator 321 with a large force by using the fixed protrusion, so that the heat dissipator 321 is closely attached to the heating component 2. In addition, a structure of the linkage part 324 in this solution is simple, and it is convenient to manufacture and assemble the heat dissipator assembly 32.

In a specific embodiment, the fixed protrusion and the heat dissipator 321 may be of an integrated structure. Therefore, reliability of a connection between the fixed protrusion and the heat dissipator 321 can be improved, and a structure of the heat dissipator assembly 32 is simplified.

To match the fixed protrusion, the end part that is of the heating component 2 and that faces the first direction X includes an abutment part. When the heating component 2 is completely plugged into the accommodating cavity, the abutment part abuts against the fixed protrusion, to drive the heat dissipator 321 to abut against the heating component 2. Specifically, the abutment part has high strength and can bear a large pressure, to protect the heating component 2, so that the heating component 2 is not damaged when the heating component 2 abuts against the fixed protrusion.

Refer to FIG. 4. The support 322 of the heat dissipator assembly 32 includes two side panels 3223 disposed opposite to each other along a third direction Z. The third direction Z is perpendicular to the first direction X and the second direction Y. The heat dissipator 321 is located between the two side panels 3223, and the sliding component 323 is disposed between a side wall of the heat dissipator 321 and the side panel 3223. Therefore, the heat dissipator 321 moves relative to the support 322. This solution helps plug the heating component 2 into the accommodating part 31 or unplug the heating component 2 from the accommodating part 31, and does not affect a movement of the heating component 2 or the heat dissipator 321, to help dispose the sliding component 323. A structure is compact, and a design is proper.

Still refer to FIG. 4. The heat dissipation apparatus 3 may include a plurality of groups of sliding components 323. The plurality of groups of sliding components 323 are symmetrically disposed on two sides of the heat dissipator 321, and a symmetry axis M of the plurality of groups of sliding components 323 is parallel to the first direction X. In this embodiment, the plurality of groups of sliding components 323 cooperate with each other to improve movement reliability of the heat dissipation apparatus 3. In addition, a surface parallel effect of the attachment between the heat dissipator 321 and the heating component 2 may further be maintained, and reliability of the attachment between the heat dissipator 321 and the heating component 2 is improved, thereby improving the heat dissipation effect of the heat dissipator 321.

A connection manner between the support 322 and the accommodating part 31 is not limited. The support 322 and the accommodating part 31 may be of an integrated structure. In other words, the support 322 and the accommodating part 31 may be understood as two parts of one component. Specifically, the support 322 may be a part of the accommodating part 31. For example, integration may be implemented in a manner such as insert injection molding by using a mold. In this way, a structure design is simple, and a connection is stable and reliable, to improve integrity of the heat dissipation apparatus and help improve overall strength. Alternatively, the support 322 and the accommodating part 31 may be of a split structure. In other words, the support 322 and the accommodating part 31 are separately independent components. Then, the support 322 and the accommodating part 31 are connected into one component, for example, in a manner such as clamping, threaded connection, riveting, screw connection, or welding. For example, the support 322 may be clamped to the accommodating part 31 by using a buckle, may be riveted to the accommodating part 31, or may be bent and pressed to the accommodating part 31. In this way, it is convenient to separately process and manufacture the support 322 and the accommodating part 31, so that manufacturing difficulty is reduced, a connection is reliable, and operating is convenient. It should be understood that a manner of connecting the support 322 to the accommodating part 31 is not limited in this embodiment of this application, and includes but is not limited to the foregoing several connection manners, which are not listed one by one herein.

Figure 6:
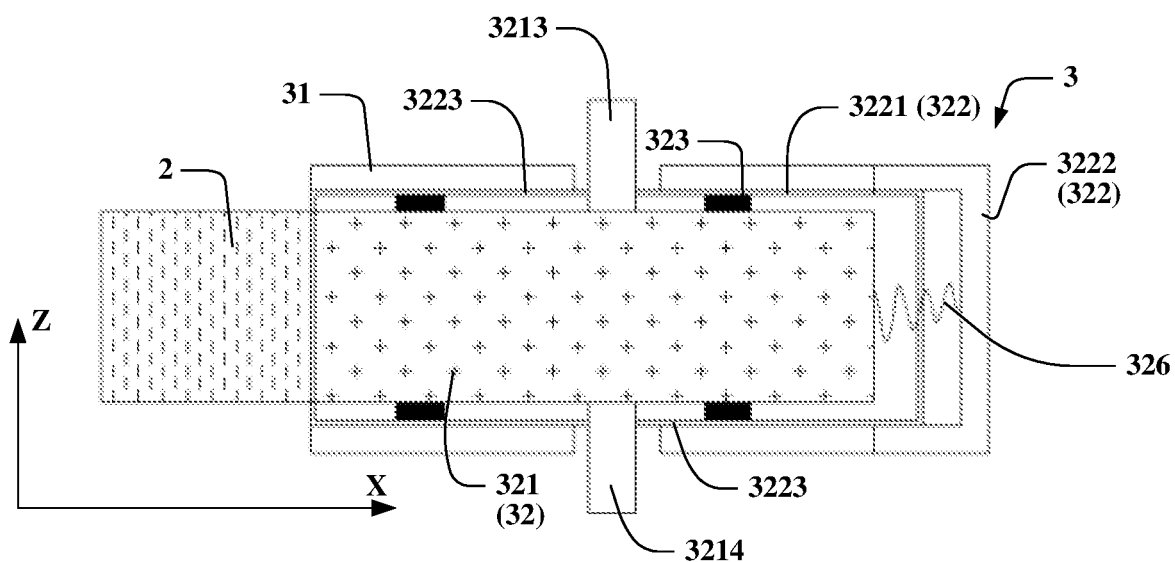
FIG. 6 is a schematic diagram of a second structure of a heat dissipation apparatus on a top view during usage according to an embodiment of this application.

In a specific embodiment, a specific structure and type of the heat dissipator 321 in the heat dissipator assembly 32 are not limited. For example, the heat dissipator 321 may be a solid heat dissipator 321 or a metal heat dissipator formed through injection molding. FIG. 6 is a schematic diagram of a second structure of a heat dissipation apparatus on a top view during usage according to an embodiment of this application. In the embodiment shown in FIG. 6, the heat dissipator 321 may alternatively be a liquid cooling heat dissipator. The liquid cooling heat dissipator includes a liquid inlet 3213 and a liquid outlet 3214. Coolant enters a cavity inside the liquid cooling heat dissipator from the liquid inlet 3213, and flows out of the liquid cooling heat dissipator from the liquid outlet 3214 after heat exchange, to implement circulation of the coolant. When the liquid cooling heat dissipator is specifically disposed, a structure such as the support 322 needs to avoid the liquid inlet 3213 and the liquid outlet 3214 of the liquid cooling heat dissipator.

Figure 7:
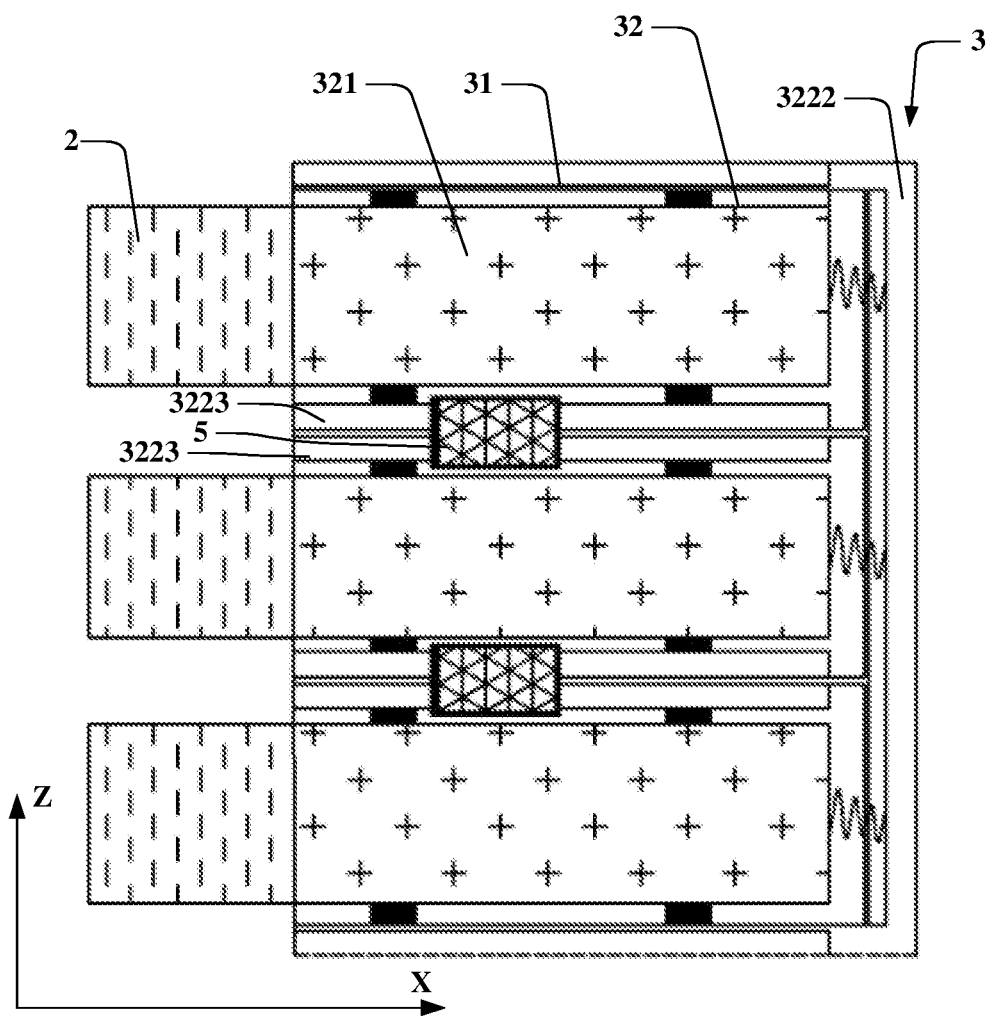
FIG. 7 is a schematic diagram of a third structure of a heat dissipation apparatus on a top view during usage according to an embodiment of this application.
Figure 8:
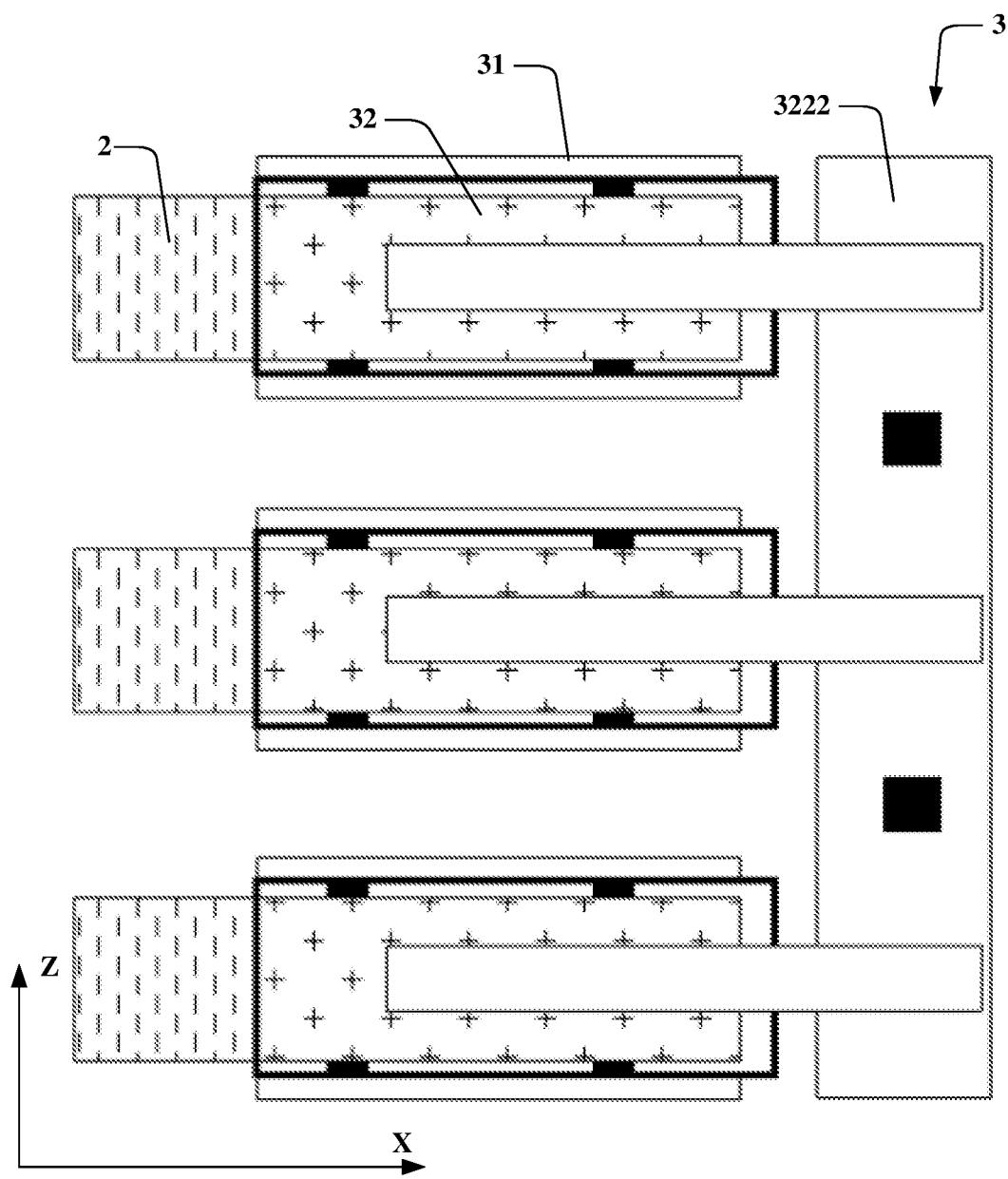
FIG. 8 is a schematic diagram of a third structure of a heat dissipation apparatus on a side view during usage according to an embodiment of this application.

FIG. 7 is a schematic diagram of a third structure of a heat dissipation apparatus on a top view during usage according to an embodiment of this application. FIG. 8 is a schematic diagram of a third structure of a heat dissipation apparatus on a side view during usage according to an embodiment of this application. As shown in FIG. 7 and FIG. 8, the heat dissipation apparatus 3 includes at least two accommodating parts 31 and at least one heat dissipator assembly 32. The heat dissipation apparatus 3 in this solution is mainly applicable to a heating component 2 including a plurality of plugs or an electronic component having a plurality of heating components 2, or is applicable to a case in which there are a plurality of heating components 2 and the heating components 2 are disposed densely, to help improve an integration degree of the device and implement miniaturization of the device.

In a specific embodiment, a quantity of heat dissipator assemblies 32 may be less than a quantity of accommodating parts 31. An accommodating part 31 in which the heat dissipator assembly 32 is not disposed may accommodate a component that is not easy to heat, or may be configured with a common heat dissipator. This is not limited in this application. In another embodiment, as shown in FIG. 7 and FIG. 8, one heat dissipator assembly 32 may be disposed for each accommodating part 31, so that the heat dissipator assembly 32 can accommodate many heating components 2, and the heat dissipation effect is good.

Figure 9:
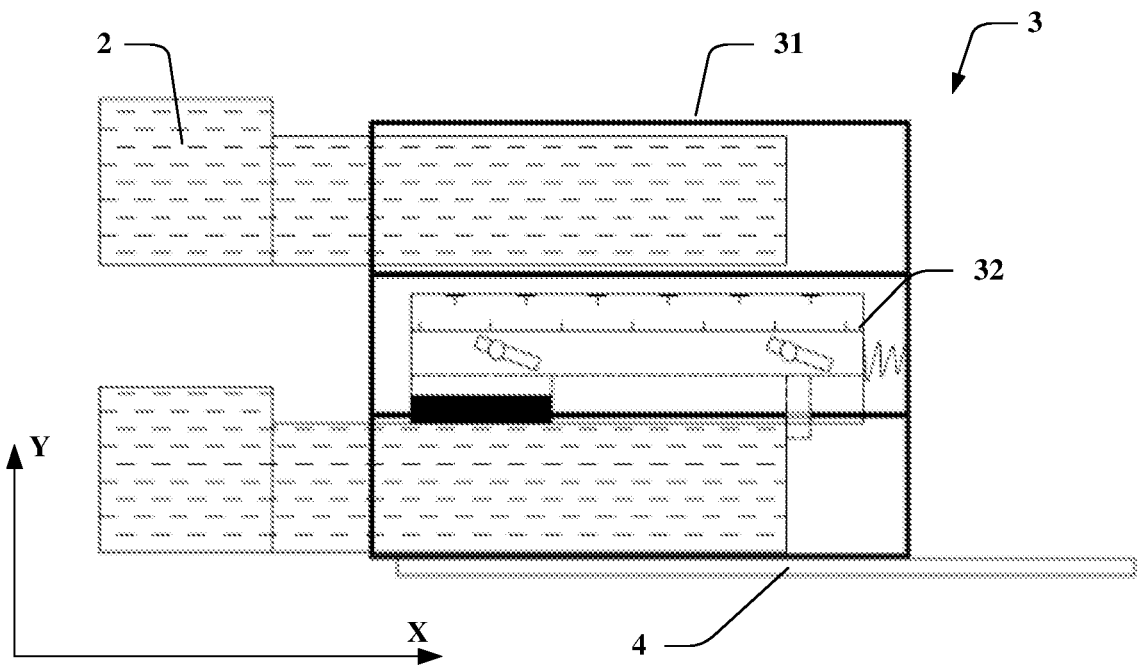
FIG. 9 is a schematic diagram of a fourth structure of a heat dissipation apparatus on a side view during usage according to an embodiment of this application.
Figure 10:
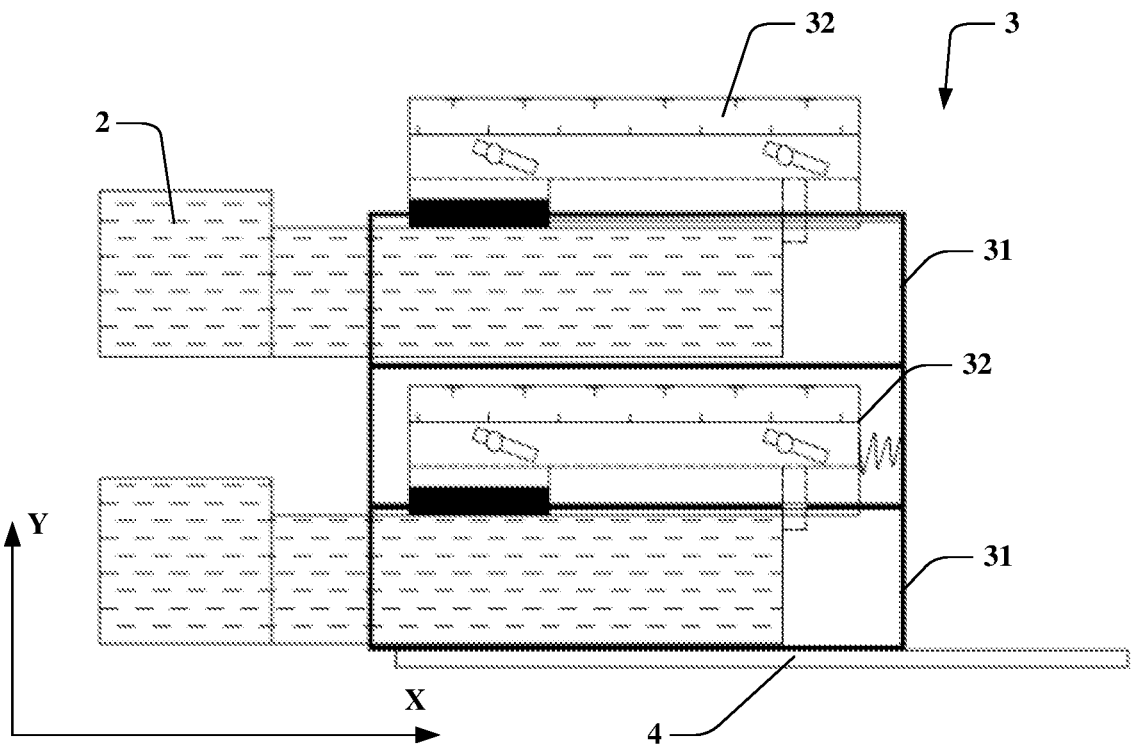
FIG. 10 is a schematic diagram of a fifth structure of a heat dissipation apparatus on a side view during usage according to an embodiment of this application.
Figure 11:
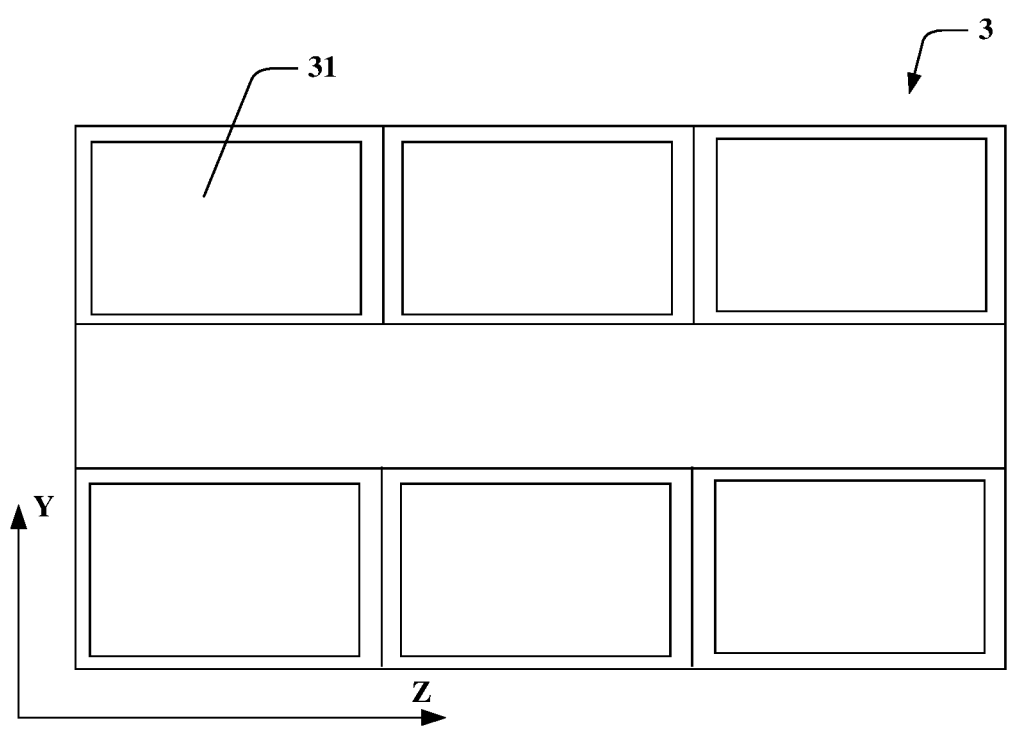
FIG. 11 is a schematic diagram of a structure of a heat dissipation apparatus on a rear view according to an embodiment of this application.

In a specific embodiment, an arrangement manner of the at least two accommodating parts 31 in the heat dissipation apparatus 3 is not limited. For example, in an embodiment, as shown in FIG. 7-8, the at least two accommodating parts 31 are arranged side by side along the third direction Z. FIG. 9 is a schematic diagram of a fourth structure of a heat dissipation apparatus on a side view during usage according to an embodiment of this application. FIG. 10 is a schematic diagram of a fifth structure of a heat dissipation apparatus on a side view during usage according to an embodiment of this application. As shown in FIG. 9 and FIG. 10, in another embodiment, the at least two accommodating parts 31 are disposed along the second direction Y in a stacking manner, and the heat dissipator assembly 32 is disposed between any two adjacent accommodating parts 31. FIG. 11 is a schematic diagram of a structure of a heat dissipation apparatus on a rear view according to an embodiment of this application. Refer to FIG. 11. In another embodiment, the accommodating parts 31 may alternatively disposed along the second direction Y in a stacking manner when being arranged side by side along the third direction Z. A manner of disposing the accommodating part 31 in each heat dissipation apparatus 3 is not limited, and a user may select a proper arrangement manner of the accommodating part 31 based on an actual product requirement.

Refer to FIG. 7 and FIG. 9. In a specific embodiment, the accommodating parts 31 of the heat dissipation apparatus 3 may be fixed into an integrated structure. Specifically, the structure may be an integrally formed structure. In other words, the plurality of accommodating parts 31 are of an integrally formed structure. Alternatively, a manner such as riveting, welding, or threaded connection may be used for the accommodating part 31, so that the plurality of accommodating parts 31 are fixedly connected. This solution helps improve the integrity of the heat dissipation apparatus 3, and reliability of an entire structure is good. Deforming or damaging is difficult.

In addition, the support 322 of the heat dissipator assembly 32 may alternatively be of an integrated structure. Certainly, the support 322 may be of an integrally formed structure, for example, a sheet metal part. Alternatively, the support 322 may be fixed into an integrated structure. For example, a fixed connection is implemented in a manner such as riveting, welding, or threaded connection. This solution helps improve the integrity of the heat dissipation apparatus 3, and the reliability of the entire structure is good. Deforming or damaging is difficult.

In still another embodiment, the support 322 of the heat dissipator assembly 32 and the accommodating part 31 may alternatively be of an integrated structure. The reliability of the entire structure is improved, and an assembly craft of the heat dissipation apparatus 3 is simplified.

Still refer to FIG. 7. The support 322 of the heat dissipator 32 includes the side panels 3223 located on two sides of the heat dissipator 321 that are along the third direction Z, and two side panels 3223 of adjacent heat dissipator 32 are fixedly connected by using a buckle 5. In addition, it may be considered that there is a side wall between adjacent accommodating parts 31, and the two side panels 3223 are fixed to the side wall by using the buckle 5, so that the heat dissipator assembly 32 is fixedly mounted on the accommodating part 31.

In the embodiment shown in FIG. 8, the at least two accommodating parts 31 may be independent of each other, and are separately assembled on the circuit board 4 or a connection board. The support 322 of the heat dissipator assembly 32 corresponding to each accommodating part 31 is respectively fixed to the accommodating part 31.

As shown in FIG. 7 or FIG. 8, when the heat dissipation apparatus 3 includes at least two heat dissipator assemblies 32, adjacent components of supports of the heat dissipator assemblies 32 may be of an integrated structure. Certainly, the support of the heat dissipator assembly 32 may be of an integrated structure, or may be fixedly connected to form an integrated structure. For example, in the embodiment shown in FIG. 7, two side panels 3223 of adjacent heat dissipator assemblies 32 may be of an integrated structure, so that the heat dissipator assemblies 32 and the accommodating part 31 are easily mounted. In addition, with reference to FIG. 7 and FIG. 8, adjacent tail supports 3222 of the heat dissipator assemblies 32 are of an integrated structure. Specifically, tail supports 3222 of all the heat dissipator assemblies 32 may be of an integrated structure. This solution helps improve the integrity of the heat dissipation apparatus 3 and reduce a mounting process of the heat dissipation apparatus 3.

Refer to FIG. 9. In a specific embodiment, when the at least two accommodating parts 31 are disposed along the second direction Y in a stacked manner, the heat dissipator assembly 32 may be disposed only between any two adjacent accommodating parts 31. The heat dissipator assembly 32 is not disposed for an uppermost accommodating part 31, or the heat dissipator assembly 32 is disposed in another manner. In the embodiment shown in FIG. 10, one heat dissipator assembly 32 may be correspondingly disposed for each accommodating part 31. In other words, the heat dissipator assembly 32 is also disposed for an uppermost accommodating part 31.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
   an accommodating part comprising an accommodating cavity configured to accommodate a heating component, wherein the heating component is configured to be plugged into the accommodating cavity along a first direction; and
   a heat dissipator assembly comprising a heat dissipator, a support, a sliding component, and a linkage part;
   wherein the support is fixed to the accommodating part;
   wherein the heat dissipator is connected to the support in a sliding manner by the sliding component;
   wherein the sliding component comprises an oblique slot and a sliding block that are adaptive;
   wherein the oblique slot is disposed on the heat dissipator and the sliding block is disposed on the support, or the oblique slot is disposed on the support and the sliding block is disposed on the heat dissipator;
   wherein a first end of the linkage part is mounted on the heat dissipator, and a second end of the linkage part is located in the accommodating cavity;
   wherein the accommodating cavity comprises a first side surface and a second side surface that are opposite to each other along a second direction that is perpendicular to the first direction;
   wherein the heat dissipator is located on the first side surface, and the oblique slot gradually approaches the second side surface along the first direction;
   wherein when the heating component is being plugged into the accommodating cavity, the linkage part is triggered to drive the heat dissipator to move along the first direction, and the sliding block slides relative to the oblique slot, to drive the heat dissipator to move toward the second side surface;
   wherein when the heating component is completely plugged into the accommodating part, the heat dissipator is attached to the heating component; and
   wherein a second resetting member is disposed between the heat dissipator and the support, and when the heating component is being unplugged from the accommodating cavity, the second resetting member is configured to drive the heat dissipator to move in a third direction that is opposite to the first direction.

2. The apparatus according to claim 1, wherein a first resetting member is disposed between the heat dissipator and the support, and when the heating component is being unplugged from the accommodating cavity, the first resetting member is configured to drive the heat dissipator to move toward a fourth direction away from the second side surface, wherein the fourth direction is perpendicular to the third direction.

3. The apparatus according to claim 1, wherein the second resetting member is an elastic heat conducting strip, a first end of the elastic heat conducting strip is connected to the heat dissipator, and a second end of the elastic heat conducting strip is connected to the support.

4. The apparatus according to claim 3, wherein the second end of the elastic heat conducting strip is connected to a heat conducting part of the support.

5. The apparatus according to claim 1, wherein at least a surface of the heat dissipator that is attached to the heating component comprises a flexible heat conducting layer.

6. The apparatus according to claim 1, wherein the heat dissipator comprises a heat conducting protrusion, and when the heating component is completely plugged into the accommodating cavity, the heat conducting protrusion is attached to the heating component.

7. The apparatus according to claim 1, comprising a plurality of groups of sliding components, wherein the plurality of groups of sliding components are symmetrically disposed on two sides of the heat dissipator, and a symmetry axis of the plurality of groups of sliding components is parallel to the first direction.

8. The apparatus according to claim 1, wherein the linkage part is a fixed protrusion, and the fixed protrusion is fixed on a surface that is of the heat dissipator and that faces a direction of the second side surface.

9. The apparatus according to claim 8, wherein the fixed protrusion and the heat dissipator are of an integrated structure.

10. The apparatus according to claim 8, wherein an end part of the heating component that faces the first direction comprises an abutment part, and when the heating component is completely plugged into the accommodating cavity, the abutment part abuts against the fixed protrusion.

11. The apparatus according to claim 1, comprising at least two of the accommodating part and at least one of the heat dissipator assembly.

12. The apparatus according to claim 11, wherein one heat dissipator assembly of the at least one heat dissipator assembly is disposed for each accommodating part of the at least two accommodating parts.

13. The apparatus according to claim 11, wherein the at least two accommodating parts are arranged side by side along a fifth direction, the fifth direction is perpendicular to the first direction and the second direction.

14. The apparatus according to claim 13, wherein the support comprises side panels located on two sides of the heat dissipator that are along the fifth direction, and side panels of two adjacent heat dissipators of the at least one heat dissipator assembly are fixedly connected to a respective one of the at least two accommodating parts by a buckle.

15. The apparatus according to claim 12, wherein the at least two accommodating parts are disposed along the second direction in a stacking manner, and the heat dissipator assembly is disposed between two adjacent accommodating parts of the at least two accommodating parts.

16. The apparatus according to claim 15, wherein the two adjacent accommodating parts are fixed into an integrated structure.

17. The apparatus according to claim 11, wherein supports of at least two heat dissipator assemblies of the at least one heat dissipator assembly are of an integrated structure.

18. The apparatus according to claim 17, wherein adjacent parts of the supports of the at least two heat dissipator assemblies are of an integrated structure.

19. A communication device, comprising:
   a heating component; and
   a heat dissipation apparatus comprising an accommodating part comprising:
      an accommodating cavity configured to accommodate the heating component, wherein the heating component is configured to be plugged into the accommodating cavity along a first direction; and
      a heat dissipator assembly comprising a heat dissipator, a support, a sliding component, and a linkage part;
   wherein the support is fixed to the accommodating part;
   wherein the heat dissipator is connected to the support in a sliding manner by the sliding component;
   wherein the sliding component comprises an oblique slot and a sliding block that are adaptive;

wherein the oblique slot is disposed on the heat dissipator and the sliding block is disposed on the support, or the oblique slot is disposed on the support and the sliding block is disposed on the heat dissipator;

wherein a first end of the linkage part is mounted on the heat dissipator, and a second other end of the linkage part is located in the accommodating cavity;

wherein the accommodating cavity comprises a first side surface and a second side surface that are opposite to each other along a second direction that is perpendicular to the first direction;

wherein the heat dissipator is located on the first side surface, and the oblique slot gradually approaches the second side surface along the first direction;

wherein when the heating component is being plugged into the accommodating cavity, the linkage part is triggered to drive the heat dissipator to move along the first direction, and the sliding block slides relative to the oblique slot, to drive the heat dissipator to move toward the second side surface;

wherein when the heating component is completely plugged into the accommodating part, the heat dissipator is attached to the heating component; and wherein a second resetting member is disposed between the heat dissipator and the support, and when the heating component is being unplugged from the accommodating cavity, the second resetting member is configured to drive the heat dissipator to move in a third direction that is opposite to the first direction.

20. The communication device of claim 19, wherein a first resetting member is disposed between the heat dissipator and the support, and when the heating component is being unplugged from the accommodating cavity, the first resetting member is configured to drive the heat dissipator to move toward a fourth direction away from the second side surface, wherein the fourth direction is perpendicular to the third direction.

* * * * *